Nov. 26, 1963
C. A. BODGE
3,112,384
THERMAL RELAYS
Filed July 29, 1959
4 Sheets-Sheet 1
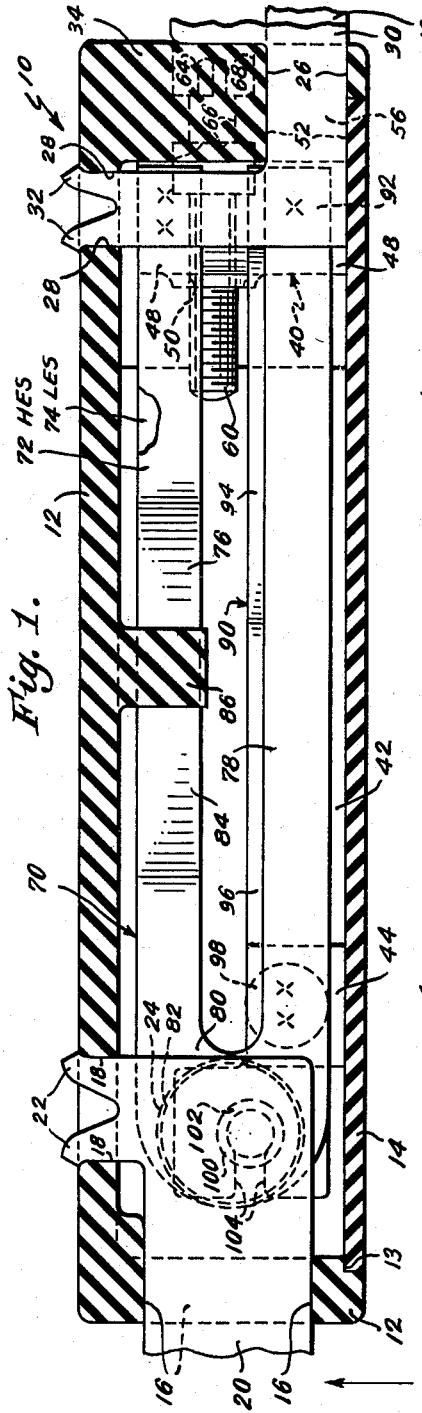
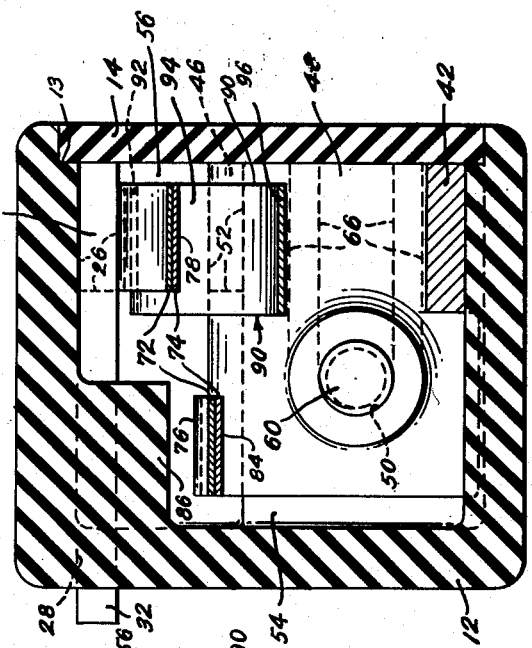
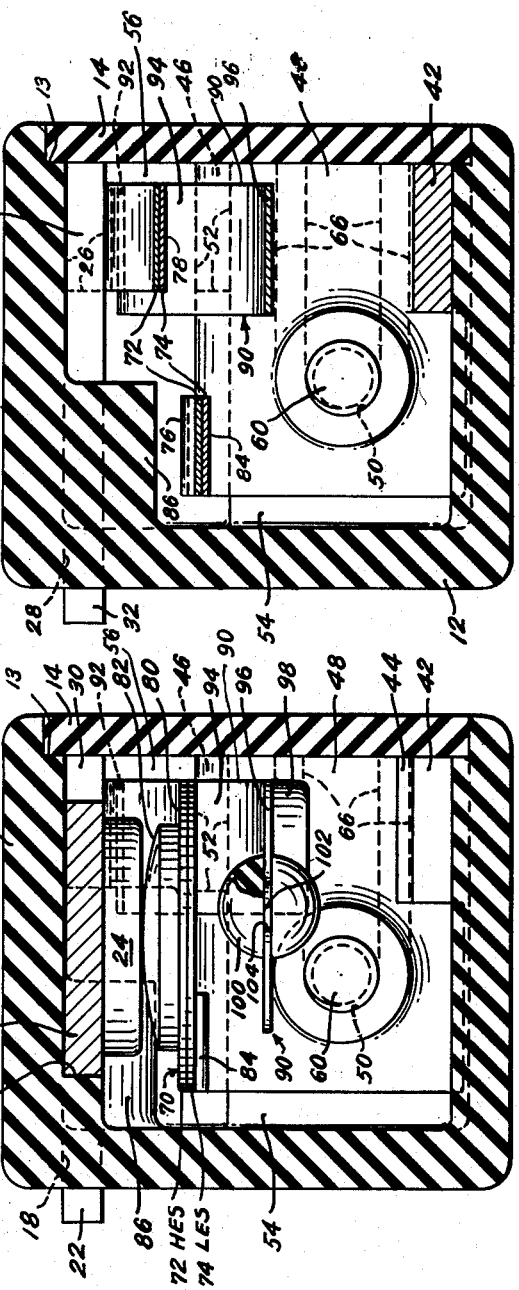
Inventor,
Clifford A. Bodge,
by Harold Levine
Att'y Nov. 26, 1963  C. A. BODGE  3,112,384
THERMAL RELAYS
Filed July 29, 1959  4 Sheets-Sheet 2
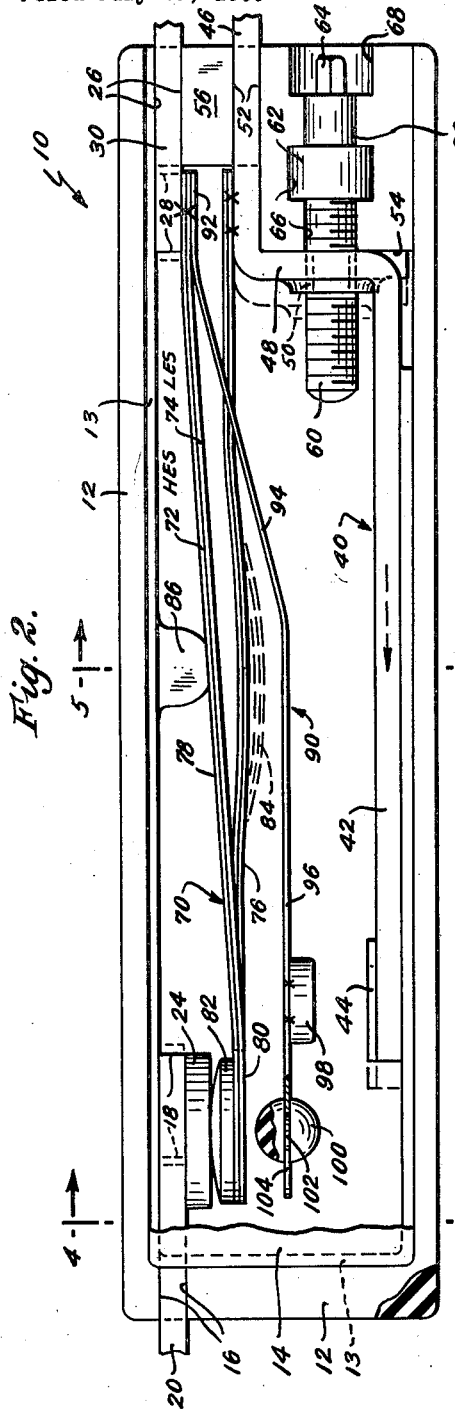
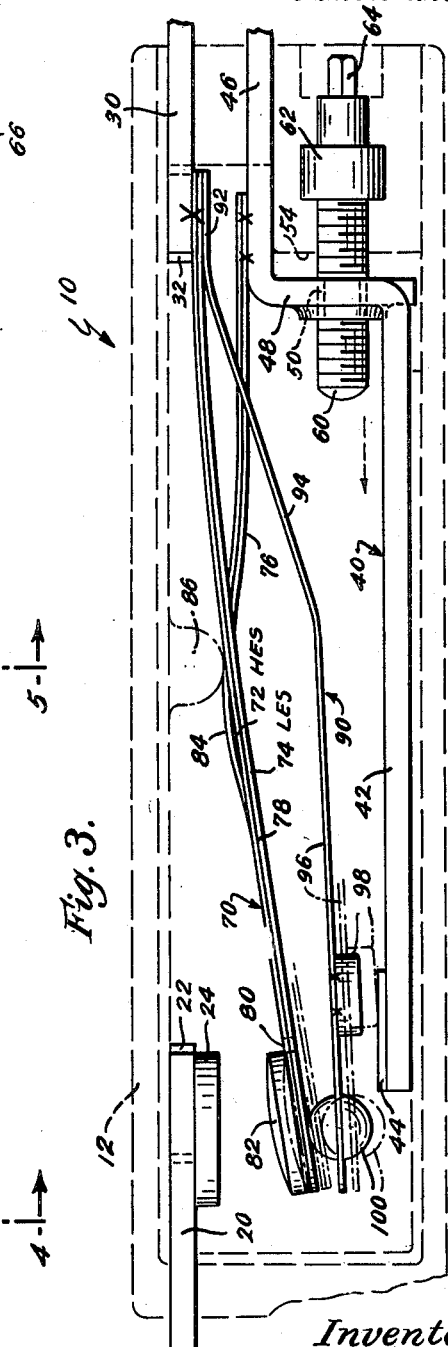
Inventor,
Clifford A. Bodge,
by 
Att'y.

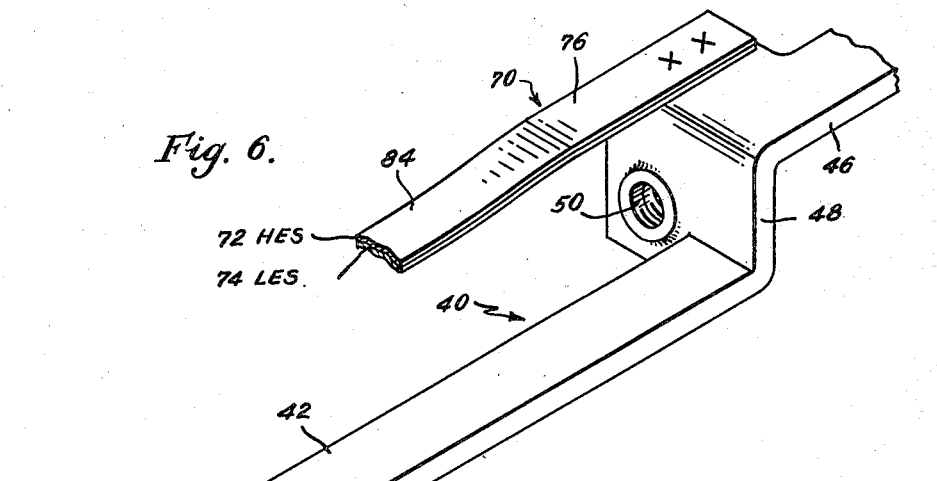
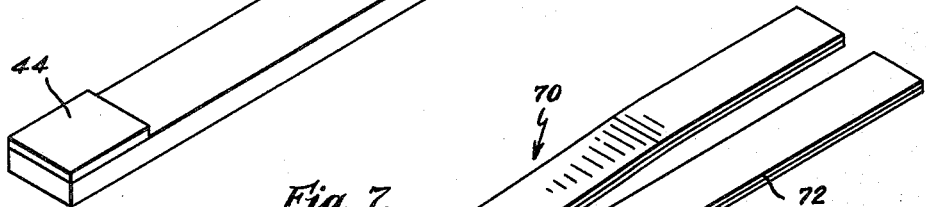
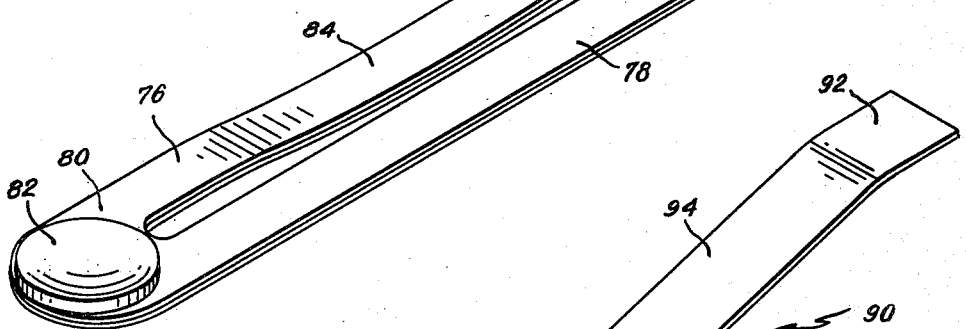
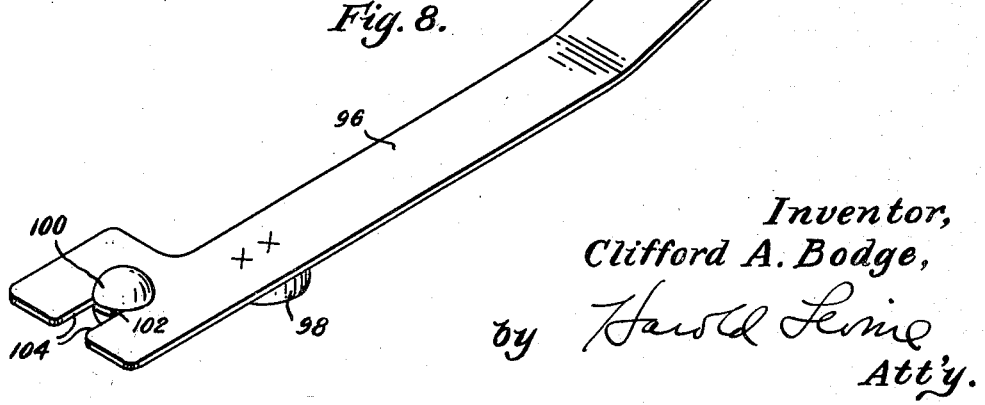

Nov. 26, 1963   C. A. BODGE   3,112,384
THERMAL RELAYS
Filed July 29, 1959   4 Sheets-Sheet 4

Inventor,
Clifford A. Bodge,
by Harold Levine
Att'y.

United States Patent Office 3,112,384
Patented Nov. 26, 1963

3,112,384
THERMAL RELAYS
Clifford A. Bodge, Alexandria, Va., assignor to Texas Instruments Incorporated, Dallas, Tex., a corporation of Delaware
Filed July 29, 1959, Ser. No. 830,425
22 Claims. (Cl. 200—122)

The instant invention relates to thermal protective devices, and more particularly, to thermal time-delay relays. The time-delay relay of the instant invention is especially suited for, though not limited to, switching and protecting the start or phase windings of split-phase electric motors, and particularly fractional horsepower split-phase electric appliance type motors having high density start windings. The start or phase winding is generally of a fine, relatively high resistance wire and generally can withstand continuous operation for only a short time. It is therefore important that a protective device for a split-phase electric motor should not permit the start winding to be subjected to currents for a damaging length of time, or to those which are excessively high. The start winding relay must be effective to deenergize the start winding in the short time specified for the particular motor and make it impossible for the start winding to become re-energized at an improper time.

It is one object of the invention to provide a thermal time-delay relay which will accomplish the above objectives.

It is another object to provide a thermal time-delay relay which is adapted for miniaturization and simple and inexpensive to manufacture and yet dependable in the performance of its functions.

It is another object of the invention to provide a relay which is especially applicable for protecting and switching the phase or start winding of fractional horse-power split-phase electrical motors such as, for example, are employed in refrigeration installations, electrical appliances, e.g. washing machines, electric dryers, and business machines, e.g. electric typewriters and calculators, etc.

It is another object to provide a thermal time-delay relay which employs an electrically conducting, thermostatic element which is self-protecting and is operative to shunt itself out to prevent overheating thereof.

It is another object to provide a thermal time-delay relay for the purposes described, the operation of which is relatively independent of the ambient temperature.

It is another object of the instant invention to provide a thermal time-delay relay for the purposes described which affords a quick reset.

It is another object to provide a thermal time-delay relay which employs a novel and unique snap-acting thermostatic element.

It is yet another object of the instant invention to provide a thermal time-delay relay for the purposes described which employs a snap-acting, thermal element having a deformed portion responsible for its snap action and which relay is provided with means for adjustably varying the amount of deformation in the snap-acting element.

Among the further objects of the instant invention are the provisions of a thermal time-delay relay which is durable, accurate, reliable in operation, compact, easily calibratable, versatile and susceptible to varying electrical ratings in diverse applications; which embodies a minimum number of parts and which is simple in construction and economical to assemble and manufacture.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

FIG. 1 is a top plan view, with part of the casing removed, of a thermal relay according to the instant invention;

FIG. 2 is a side elevational view, with the cover broken away;

FIG. 3 is a side elevational view similar to FIG. 2, with the base structure outlined in broken lines, indicating relative movement between parts;

FIG. 4 is a sectional view taken on line 4—4 of FIG. 2;

FIG. 5 is a sectional view taken on line 5—5 of FIG. 2;

FIGS. 6, 7 and 8 are perspective views of various components of the thermal relay of the instant invention.

Figure 9:
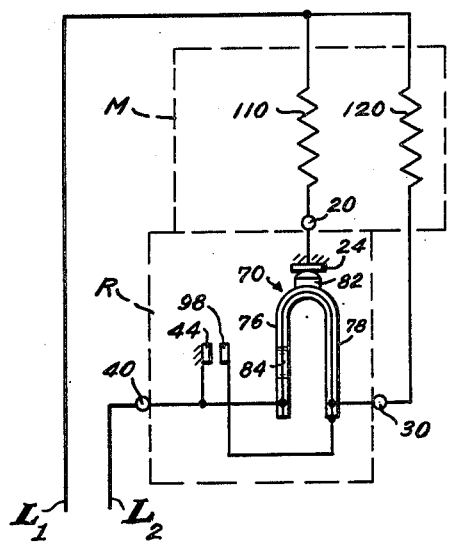
FIGS. 9 and 10 are schematic wiring diagrams for the relay illustrated in FIGS. 1–8 in combination with a split-phase motor.

Dimensions of certain of the parts as shown in the drawings have been modified for the purposes of clarity of illustration.

Similar reference characters indicate corresponding parts throughout the several views of the drawings.

Referring now to the drawings, there is illustrated in FIGS. 1–8 a thermal time-delay relay, generally referred to by numeral 10, illustrating one embodiment of the instant invention. Thermal relay 10 includes a base member 12 and a cover member 14 formed of one of the conventional, electrically insulating plastics, such as, a moldable plastic, phenolic, resinous material. The cover member may, in practice, be fabricated from electrically insulating sheet material. Base 12 is provided with an interiorly peripherally extending ledge 13 which interfits with and mounts cover member 14. Cover member 14 may be secured to base 12 in any known, convenient manner, such as by bolting, gluing or deforming, etc. (not shown).

Base member 12 is provided with an open-ended slot 16 and a slot 18, which slots co-operatively interfit with and mount electrically conductive terminal 20. Terminal 20 is slidably inserted on the base 12 in slots 16 and 18 in the direction of the arrow (as seen in FIG. 1), after which terminal 20 is staked adjacent slot 18, as at 22, to fix the terminal in assembled relation on the base member. Terminal 20 is provided with a stationary, electrical contact 24 fixedly mounted and electrically connected to its lower surface, as best seen in FIGS. 2 and 3.

Base member 12 is further provided with an open-ended slot 26 and a slot 28 which slots are similar to open-ended slot 16 and slot 18, which slots 26 and 28 respectively and co-operatively interfit with and mount electrically conductive terminal 30. Terminal 30 is inserted into the base in the same manner as that described above for terminal 20 and is staked adjacent slot 28 as at 32. Base 12 provides a rectangular-shaped projection 34 which abuts and co-operates with thermal 30 and with staking 32 to maintain the terminal 30 in fixed assembled relation within base 12.

Thermal relay 10 also includes an adjustably mounted terminal 40, as best seen in perspective in FIG. 6. Terminal 40 includes an elongated leg portion 42 which has, at one end thereof, fixedly mounted and electrically connected to its upper surface, an electrical contact 44.

As best seen in FIGS. 2 and 3, terminal 40 includes an upper leg portion 46 spaced from and substantially parallel to leg 42 and extending to the exterior of the base member 12.

Terminal 40 also includes a vertically extending portion 48 (as seen in FIGS. 2 and 3), which interconnects leg portions 42 and 46. Portion 48 includes a threaded aperture 50 for a purpose to be described below.

Base 12 is provided with an open-ended slot 52 which co-operatively interfits with and mounts terminal 40. Terminal 40, when in assembled relationship within base 12, has leg 46 thereof in open-ended slot 52, as best seen in FIGS. 2 and 3. Portion 48 of terminal 40 is adapted for engagement with abutting shoulder 54 provided by casing 12, as best seen in FIG. 3. Portion 56 of base 12, between slots 26 and 52, serves to electrically insulate terminals 30 and 40 from each other. Open-ended slots 16, 26 and 52 respectively permit each of terminals 20, 30 and 40 to be slidably mounted on the thermal relay from the same side of the casing, namely; from the open end of the casing which is closed by cover member 14.

Thermal relay 10 is further provided with an adjusting screw 60 which interfits in threaded engagement with threaded aperture 50 of portion 48 of terminal 40, as best seen in FIGS. 2 and 3. Adjusting screw 60 includes a collar 62 and a head portion 64. Base member 12 is provided with an open-ended slot 66 for the reception of adjusting screw 60. The clearances between open-ended slot 66 and adjusting screw 60 are not shown in FIGS. 2 and 3. As can best be seen in FIG. 5, open-ended slot 66 extends to the open side of the base 12 which is closed by cover member 14 and permits slidable insertion of adjusting screw 60 from the same side of the base 12 as the terminals 20, 30 and 40 are inserted.

As can best be seen in FIGS. 2 and 3, open-ended slot 66 is shaped so as to mate and interfit with the shank portion of adjusting screw 60 and the collar portion 62 so as to prevent relative longitudinal movement between adjusting screw 60 and base 12 when the former is rotated exteriorly of the thermal relay, as at 64. Base 12 further includes an opening 68 to permit rotation of adjusting screw 60 exteriorly of the thermal relay.

From the above, it can be seen that terminal 40 is mounted so as to be longitudinally movable with respect to base 12 upon rotation of adjusting screw 60. Abutting shoulder 54, provided by base member 12, acts as a stop for limiting adjusting movement of terminal 40 by adjusting screw 60 in a right-hand direction, as seen in FIG. 2.

Thermal relay 10 is further provided with a thermally responsive member generally indicated by the numeral 70 which may be formed of a conventional thermostatic material such as bimetal, formed of two layers 72 and 74 having unequal coefficients of thermal expansion, with the outer layer 72 having the higher coefficient of thermal expansion. Layers 72 and 74, which are respectively the high and low expansion layers, are respectively represented on the drawings by HES and LES. Thermally responsive element 70 is a snap-acting device which is bifurcated or U-shaped in plan, as best seen in FIG. 1, and includes legs 76 and 78, and a bight portion 80. FIG. 7 illustrates the snap-acting thermally responsive element 70 in perspective. Thermally responsive element 70 has mounted at its bight portion at the upper surface thereof, a contact 82 adapted for engagement with contact 24.

Thermally responsive element 70 is cantilever mounted in thermal relay 10, as will be described below. The free ends of each of legs 76 and 78 are respectively electrically connected and secured, as by welding, to terminals 40 and 30, as best seen in FIGS. 2 and 3. As is clear from the drawings, terminals 30 and 40 respectively maintain the free ends of legs 76 and 78 of thermally responsive element 70 in vertically spaced relation (as seen in FIGS. 2 and 3). Leg 76, which is connected to adjustably mounted terminal 40, is provided with a deformed or buckled portion 84 of a bowed configuration, which is responsible for the snap action of the element. The snap-acting thermal element 70 can be calibrated by varying the amount of deformation of the bowed configuration 84 by the means of the adjustable terminal 40 and adjusting screw 60.

In practice, thermally responsive element 70 can be stamped with or without an initial deformation and secured to terminals 30 and 40 and mounted on the base, after which screw 60 is rotated until the desired amount of deformation of bowed portion 84 is provided. It is preferable, however, in fabrication, to provide leg 76 with a very slight initial deformation so as to assure that when adjusting screw 60 is rotated, leg 76 will deform in the desired direction. This initial deformation is shown in solid lines in FIG. 2, and the final deformation for desired calibration is shown in dashed lines which is effected by rotation of adjusting screw 60 and movement of terminal 40, which movement is also shown in dashed lines. The deformed or bowed portion 84, shown in solid lines in FIG. 3, is the final deformation which has been effected by proper adjustment of terminal 40 by movement toward the left in the direction of the arrow. FIG. 3 illustrates the configuration of the element 70 after it has snapped from the position of stability shown in FIG. 2.

As can be seen from FIG. 2, the thermally responsive element 70 is affixed as a cantilever, one leg 78 being held securely by terminal 30, while the other leg 76 is forced into compression by movement of terminal 40 (in the direction of the arrows shown in FIGS. 2 and 3) and consequently buckles or bows downwardly (as shown in dashed line portions in FIG. 2) in relation to the other leg 78. The high-expansion side of the material 72, being the upper layer (as viewed in FIGS. 2 and 3), is on the innerside of the buckled or bowed portion 84. Upon heating of the element 70, the secured leg 78 attempts to deflect but is resisted by the buckled or bowed leg 76. When thermally responsive element 70 heats sufficiently so that the forces tending to move the secured leg 78 overcome the resisting force of the buckled leg 76, the device snaps from the position shown in FIG. 2 to the position shown in FIG. 3. Thermally responsive element 70 has two positions of relative stability, one (which is shown in FIG. 2) wherein the deformed portion 84 of leg 76 is bowed in a downward direction and another position of relative stability, as shown in FIG. 3, wherein the deformed portion 84 of leg 76 is bowed in an upward direction. Thermally responsive element 70, upon being heated sufficiently, will snap from the position of relative stability shown in FIG. 2 to that shown in FIG. 3. As the element cools down, it will eventually snap back to the position of relative stability shown in FIG. 2 from that shown in FIG. 3. Contacts 24 and 82 are normally closed, and as will be discussed more fully below, are generally the start contacts in a circuit for protecting and switching of the start or phase winding of a split-phase electrical motor. Contacts 24 and 82 are opened as the thermal element snaps from the contacts closed position of relative stability, shown in FIG. 2, to a contacts-open position of relative stability, as shown in FIG. 3.

Base 12 is provided with a transversely extending projection 86 adjacent deformed portion 84 and serves as a stop for the deformed or bowed portion 84 to bear against when the element is in the contacts-open position (as shown in FIG. 3). Projection 86 provides the bowed portion 84 of leg 76 with a fulcrum point to bear against for its snap action, as described above, and when the thermally responsive element 70 is in a contacts-open position, projection 86 acts as a limit stop and cooperates to prevent the thermal element 70 from creeping to a contacts-closed position. Otherwise, in a condition of gradual temperature change, thermally responsive element 70 may creep to close the contacts prior to its snap action, in spite of the presence of the deformed or dished portion.

It should be noted that thermally responsive element 70, after it has snapped to a contacts-open position, as shown in full lines in FIG. 3, is free to creep downwardly, as shown in dashed line portions in response to further heating of the thermally responsive element, which is advantageous as will be described below.

Calibration and adjustment of the contact pressure between contacts 24 and 82, may be achieved both by suitably positioning the terminal 40 by its adjusting screw 60 so as to achieve the desired deformation and also by varying the dimensions of stop 86. Further, the intensity of the snap action may be regulated by varying the compression in the buckled or deformed leg 76 by proper positioning of terminal 40, to which the free end of deformed leg 76 is secured, as described above.

It should be understood that deformed leg 76 of thermally responsive element 70 need not be formed of bimetal but could also be monometal. The affixed leg 78 can be constructed so as to provide sufficient thermal activity to overcome the resistance to movement by the rigidity of the buckled or bowed portion 84 of deformed leg 76 and cause snapping of the element. However, for ease and simplicity of fabrication, it is preferred to form the entire bifurcated element 70 of bimetal.

In practice, deformed leg 76 may be made shorter than leg 78 so as to prevent misorientation during assembly and assure that the high-expansion layer 72 will be on the upper side as viewed in FIGS. 2 and 3.

Thermal relay 10 further includes an electrically conducting switch means or shunt means generally indicated at 90. As best seen in perspective in FIG. 8 and in FIGS 2 and 3, shunt means 90 comprises an elongated member having one end 92 electrically connected and secured, as by welding, to terminal 30 through bimetal leg 78. Shunt bar or strip 90 includes an angularly disposed portion 94 connected to a longitudinally extending portion 96 which lies beneath thermally responsive element 70, as best seen in FIGS. 2 and 3.

Portion 96 of shunt member 90 has electrically connected and secured to its lower surface, a contact 98 which is movable into and out of engagement wtih contact 44 carried by terminal 40, as best seen in FIGS. 2 and 3. Portion 96 is further provided with an insulating button or abutment member 100 adjacent its free end, as best seen in FIGS. 2 and 3. Insulating button 100 is formed of a deformable, electrically insulating material such as, for example, nylon or Teflon (the latter being a registered trademark to E. I. du Pont de Nemours Co. for a plastic consisting of a tetrafluoroethylene polymer), and is provided with a circumferentially extending groove 102, as best seen in FIG. 8. Portion 96 of shunt member 90 is provided with an open-ended keyhole shape slot 104 which is adapted to mate with and receive circumferentially extending groove 102 of insulating button 100 to mount the latter in fixed relation thereto. Electric switch or shunt means 90 may be formed of a conventional, electrically conducting spring-type material such as beryllium copper alloy or a Phosphor bronze alloy. Shunt member 90 is spring biased to a contacts (98—44) open position, as best seen in FIG. 2. Contacts 44 and 98 are normally open and comprise a pair of normally open shunting contacts in a circuit which includes a pair of normally closed contacts for switching and protecting the start or phase winding of a split-phase electrical motor, as will be discussed more fully below.

In practice, terminals 30 and 40, adjusting screw 60, shunt bar 90 and thermal element 70 are pre-assembled as a subassembly which is slidably mounted on base 12 in the respective slots, after which terminal 20 is slidably inserted into slot 16 and terminals 20 and 30 are staked in place. Thereafter, the open end of the casing 12 is sealed by cover member 14. Adjusting screw 60 is then rotated, as at 64, through the opening 63, by a suitable tool so as to cause movement of terminal 40 to effect desired calibration and deformation of bowed portion 84 of leg 76 of the thermal element 70.

The thermal relay thus far described, as illustrated in FIGS. 1-8, is especially adapted for use as a protective switching device for a split-phase electrical motor having an auxiliary phase winding or start winding and a main winding.

Figure 10:
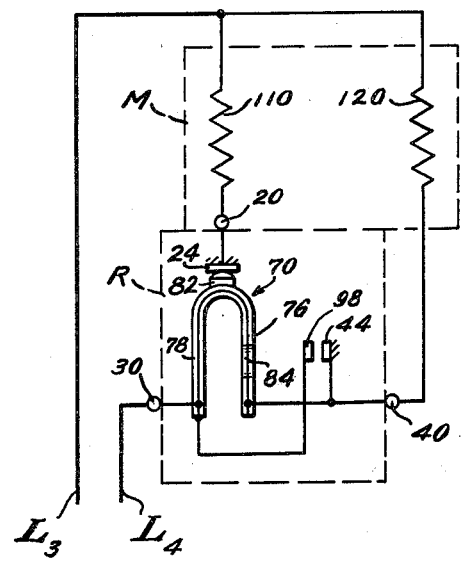

Referring now to the circuit diagrams of FIGS. 9 and 10, thermal relay 10 is schematically illustrated in circuits with a motor having an auxiliary start or phase winding 110 and a main winding 120.

Referring now specifically to FIG. 9, terminal 40 of the thermal relay 10 is electrically connected to $L_2$, one side of a power source. Terminal 20 is electrically connected in series with start or phase winding 110 and terminal 30 is electrically connected in series with main winding 120. Normally closed start contacts 24 and 82 are connected n series with start or phase winding 110 through terminal 20. Legs 76 and 78 of bimetal element 70 are connected in series with the main winding 120 through terminal 30 and normally open shunting contacts 44 and 98 are connected in shunt across legs 76 and 78 and thus shunting contacts 44 and 98 are also connected in series with main winding 120 through terminal 30. As shown in FIG. 9, the bimetal element 70 carries both the start and main winding currents when starting contacts 24 and 82 are closed. In this condition, deformed leg 76 of thermally responsive element 70 carries both the start and main winding currents and leg 78 carries only the main winding current. When start contacts 24 and 82 are separated, and shunt contacts 44 and 98 are open, both legs of thermally responsive element 70 will carry only the main winding or line current.

Referring now to FIG. 10, terminal 30 is electrically connected to $L_4$, one side of a power source. Terminal 20 is electrically connected in series with start winding 110 and terminal 40 is electrically connected in series with main winding 120. In the circuit of FIG. 10, thermally responsive element 70 carries both the main and start winding currents, as in the circuit of FIG. 9. However, fixed leg 78 now carries both the start and main winding currents and deformed leg 76 carries only the main winding current when start contacts 24 and 82 are closed. Legs 76 and 78 of thermally responsive element 70 are connected in series with main winding 120 through terminal 40 and normally open shunting contacts 98 and 44 are connected in shunt across legs 76 and 78, and thus the shunting contacts are also connected in series with the main winding 120 through terminal 40. Normally closed start contacts 24 and 82 are electrically connected in series with start winding 110 through terminal 20.

The sequence of operation of the thermal relay 10 is substantially as follows: when the circuit of FIG. 9 is energized upon starting of the motor, start winding current flows through terminal 40, deformed leg 76, normally closed start contacts 82 and 24 and terminal 20 to the start winding 110. Main winding current flows through terminal 40, legs 76 and 78 of thermally responsive element 70, to terminal 30 and to the main winding 120. When start contacts 82 and 24 are closed, the thermally responsive element 70 will be heated by both the start and main winding currents flowing through leg 76 and the main winding current flowing through leg 78 and as the motor comes up to speed, the thermally responsive element 70 will snap from the contacts-closed position of stability, shown in FIG. 2, to the contacts-open position of stability, as shown in full lines in FIG. 3, so as to open normally closed start contacts 24 and 82 and thereby de-energize start winding 110 within the required very short time. Thereafter, as the thermally responsive element 70 is further heated by the continued main winding current flowing therethrough, it will creep downwardly, as best seen in the dashed line portions in FIG. 3.

As thermally responsive element 70 continues to move downwardly, its engagement with the insulating abutment button 100 of shunting bar 90 (as clearly shown in FIG. 3) will urge normally open shunting contacts 98 and 44 into engagement against the spring bias of shunt member 90, to shunt out and thereby protect thermally responsive element 70 from overheating. After shunting contacts 44 and 98 are closed, thereby shunting the main winding or line current out of the thermally responsive element 70, the latter will cool, move upwardly as seen in FIG. 3, and permit shunting contacts 98 and 44 to open under the spring bias of shunting member 90 and thereby cause the main winding current to again flow through the thermally responsive element and result in further heating thereof. This further heating causes thermally responsive element 70 to again move in a direction to close shunting contacts 44 and 98 before the thermally responsive element has cooled sufficiently to bear against stop 86 and snap to a start contacts (24—82) closed position. This cyclic action continues as long as the motor is energized. Shunting contacts 44 and 98, in cycling between a contacts-open and -closed position while start contacts 24 and 82 are open, are effective to maintain thermally responsive element 70 at a lower temperature, which is slightly above the reset temperature of the device (that is, that temperature at which thermally responsive element 70 will bear against stop 86 and snap from a start contacts-open position, as seen in solid lines in FIG. 3, to a start contacts-closed position of stability, as seen in FIG. 2, to re-energize the start winding). The shunting contacts 44 and 98, by co-operating with thermally responsive element 70 to maintain the latter at its lower temperature, advantageously affords a quick reset of the device.

Thus, it is seen from the above that thermally responsive element 70 is effective to de-energize the start winding and is also effective to protect itself from overheating and maintain itself at a temperature just slightly above the reset temperature, while the motor is energized, by cyclically causing shunting contacts 44 and 98 to shunt the main winding current out of the thermally responsive element 70, as described above. Once having opened the starting contacts 24 and 82, thermally responsive element 70 will maintain the start contacts open while current flows through the main winding and will hunt between a position in which both the starting contacts 24 and 82 and shunting contacts 44 and 98 are open and a position in which the start contacts are open and the shunting contacts are closed.

Thermal relay 10 can also be constructed so as to provide a quick reset of the start contacts by calibrating the bimetal element for a high operating temperature so that the latter will cool quickly and afford a quick reset. By calibrating the thermally responsive element 70 for a high operating temperature, the operation of the relay can be made relatively independent of minor changes in ambient temperature.

The novel, snap-acting, thermally responsive element 70 of the instant invention provides numerous, unobvious advantages over prior art snap-acting thermostatic devices. For example, snap-acting thermal element 70 can be easily fabricated, such as by stamping without close tolerances for the amount of curvature or deformation in leg 76 whereas snap-acting disc-type thermostatic devices generally require special dies and close tolerances, etc. The snap-acting thermal element 70 can be fabricated without providing any deformation in leg 76, if desired. However, as pointed out above, it is desirable that a slight initial deformation be provided. Snap action calibration can be easily effected simply by appropriate movement of leg 76 by adjusting movement of terminal 40 through adjusting screw 60. The snap-acting thermal element 70 is thus both simple and inexpensive to manufacture and easily calibratable. With a given operating current, this snap-acting thermally responsive element exerts a greater contact pressure than that attainable by a creep-type thermally responsive element under the same condition. (Operating current for this purpose, is defined as the amount of current needed at a given ambient temperature flowing through the element to cause the contacts to separate.) Conversely, at a given contact pressure, the snap-acting device 70 requires less operating current or power to separate the contacts than that for a creep-type device of the same resistance, etc.

Thermal time-delay relay 10 can be employed in a plurality of circuit arrangements, such as, for example, the two exemplary circuits shown in FIGS. 9 and 10 wherein the thermally responsive element 70 is connected either on the line side or main winding side (i.e. terminals 30 and 40 can be selectively connected to the line or main winding side).

From the above, it is clear that the thermal relay 10 provides a miniaturized, simply constructed, low-cost device with a minimum number of parts, which is reliable in operation and with the thermally responsive element 70 serving the dual function of de-energizing the start windings and of self-protection from overheating by main winding currents and in maintaining its temperature just slightly above the reset temperature when the motor is energized by shunting itself out as described above.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A switching device comprising a pair of normally closed contacts; a pair of normally open contacts; snap-acting thermally responsive, electrically conductive means, one of said normally closed contacts being mounted on and electrically connected to said means for snap movement away from the other of said normally closed contacts in response to movement of said thermally responsive means in one direction at a first predetermined flow of current therethrough; electrically conductive contact-carrying means mounting one of said normally open contacts for creep movement into engagement with the other of said normally open contacts in response to further movement of said thermally responsive means in said one direction at another predetermined current flow therethrough to shunt out said thermally responsive means upon mutual engagement of said normally open contacts; a portion of said contact-carrying means being movable relative to and engageable by a portion of said thermally responsive means for movement therewith; and means electrically insulating said portions.

2. The device as set forth in claim 1 and wherein said electrically insulating means comprises an abutment formed of electrically insulating material mounted on one of said portions for engagement by the other of said portions.

3. A control device for an electric motor having a main and a phase winding; comprising three electrical terminals; a pair of normally closed electrical contacts and a pair of normally open electrical contacts, one of said normally closed contacts being electrically connected to a first one of said terminals; electrically conducting, snap-acting thermally responsive means electrically connected to and carrying the other of said normally closed contacts for snap movement into and out of engagement with said one of said normally closed contacts; electrically conducting switch means at one portion thereof being electrically connected to a second one of said terminals, one of said normally open electrical contacts being electrically connected to the third one of said terminals, the other of said normally open contacts being electrically connected to and carried by said switch means for movement into and out of engagement with said one of said normally open contacts, said electrically conducting thermally responsive means having spaced portions respectively electrically connected to said second and third terminals, said thermally responsive means being mounted for movement in response to predetermined current flow therethrough to open said normally closed contacts with snap action at one predetermined current flow condition, said switching means being movable relative to and engageable by said thermally responsive means to move therewith to close said normally open contacts by creep action and thereby shunt out said thermally responsive means in response to movement thereof at another predetermined current flow condition.

4. The control device as set forth in claim 3 and wherein said thermally responsive means comprises a bifurcated snap-acting element with at least one leg thereof formed of composite metal, the free ends of each of the legs of said element being respectively electrically connected to and mounted on said second and third terminals, a portion of one of said legs having a deformation therein responsible for the snap action of the element.

5. The control device as set forth in claim 3 and wherein said thermally responsive means comprises a bifurcated snap-acting element with at least one leg thereof formed of a composite metal, the free ends of each of the legs of said element being respectively electrically connected to and mounted on said second and third terminals, a portion of one of said legs having a deformation therein responsible for the snap action of the element; means associated with the one of said second and third terminals mounting said one leg for adjustably varying the amount of deformation of said portion of said one leg.

6. A switching device comprising a pair of normally closed contacts; a pair of normally open contacts; thermally responsive, electrically conductive means comprising a bifurcated snap-acting element with at least one leg thereof formed of a composite metal, said switching device including three electrical terminals, one of said normally closed contacts being electrically connected to a first one of said terminals, the other of said normally closed contacts being mounted for movement away from said one of said normally closed contacts in response to movement of said thermally responsive means at a first predetermined flow of current therethrough; electrically conductive contact-carrying switch means electrically connected to a second one of said terminals, one of said normally open electrical contacts being electrically connected to the third one of said terminals, the other of said normally open contacts being carried by said switch means for movement into and out of engagement with said one of said normally open contacts; the free ends of each of the legs of said thermally responsive element being respectively electrically connected to and mounted on said second and third terminals, a portion of one of said legs having a deformation therein responsible for the snap action of said element; and means associated with one of said second and third terminals mounting said one leg for adjustably varying the amount of deformation of said portion of said one leg, said thermally responsive means being adapted to engage said switch means to close said normally open contacts and thereby shunt out said thermally responsive means in response to movement thereof at a predetermined condition thereof.

7. A thermal relay comprising a pair of normally closed electrical contacts; a pair of normally open electrical contacts; an electrically conductive, thermally responsive means operatively connected to open said normally closed contacts and to close said normally open contacts by movement thereof at predetermined temperature conditions thereof; said means comprising a snap-acting composite metal bifurcated element; a portion of one of the legs of said bifurcated element having a deformation therein intermediate the ends thereof responsible for the snap action of the element; and one of said normally open contacts being electrically connected to one end of said element and the other of said normally open contacts being electrically connected to the other end of said element whereby closing of said normally open contacts is effective to shunt said entire element.

8. In an electrical switch structure comprising at least a pair of electrical contacts, snap-acting thermally responsive means for actuating said contacts, said means comprising a snap-acting bifurcated element, a portion of one of the legs of said bifurcated element having a deformation therein responsible for the snap action of the element, means constraining the free end of the other of said legs of said element; adjustable means connected with and constraining the free end of said one leg and movable longitudinally with respect thereto for adjustably varying the deformation in said portion of said one leg; and stop means engageable with said deformed portion when said element snaps in one direction.

9. In an electrical switch structure comprising at least a pair of electrical contacts, snap-acting thermally responsive means for actuating said contacts, said means comprising a snap-acting bifurcated element, a portion of one of the legs of said bifurcated element having a deformation therein responsible for the snap action of the element, said bifurcated element being cantilever mounted on said switch structure at an end thereof remote from the bight portion thereof; and adjustable means constraining the free end of said deformed leg, said adjustable means being movable longitudinally with respect to said one leg to adjustably vary the deformation in said portion of said one leg and said adjustable means being spaced from the free end of the other of said legs in electrically insulated relation therewith.

10. A snap-acting device comprising a bifurcated blade-like element, the free ends of each of the legs of said bifurcated element being constrained and lying in separate spaced planes, displaced apart in a direction transverse to the plane of said blade-like element a portion of one of said legs being of a bowed configuration, said one leg of said element being snappable between two positions of opposite configuration, in one of which said portion of said one leg is bowed in one direction and in the other of which it is bowed in an opposite direction, said element passing from one of said positions to the other with a snap action.

11. A snap-acting thermostatic device comprising a snap-acting bifurcated element, the free ends of each of the legs of said bifurcated blade-like element being constrained and lying in separate spaced planes, displaced apart in a direction transverse to the plane of said blade-like element a portion of one of said legs being of a bowed configuration, said one leg of said element being snappable between two positions of opposite configuration, in one of which said portion of said one leg is bowed in one direction and in the other of which it is bowed in an opposite direction, said element passing from one of said positions to the other with a snap action in response to predetermined temperature variations, at least one of said legs being formed of a composite thermostatic metal and stop means engageable with said bowed portion of said one leg when said element snaps in one direction.

12. A snap-acting device comprising a snap-acting bifurcated element, the free ends of each of the legs of said bifurcated element being constrained, a portion of one of said legs being of a bowed configuration, said element being snappable between two positions, in one of which said portion of said one leg is bowed in one direction and in the other of which it is bowed in an opposite direction, said element passing from one of said positions to the other with a snap action and adjustable means constraining the free end of said one leg, said adjustable means being movable longitudinally with respect to said one leg to adjustably vary the bowed configuration in said portion of said one leg and said adjustable means being spaced from the free end of the other of said legs, in electrically insulated relation therewith.

13. The switching device as set forth in claim 1 and wherein said contact-carrying means resiliently biases said one of said normally open contacts for movement away from said other of said normally open contacts.

14. A thermal relay comprising a pair of normally closed contacts; a pair of normally open contacts; a snap-acting thermally responsive electrically conductive member having a free end portion and mounted adjacent another end thereof for movement in response to temperature change; one of said normally closed contacts being electrically connected to and mounted on said member for snap movement away from the other of said normally closed contacts in response to movement of said thermally responsive member when the latter is heated to a first amount by the flow of current therethrough; electrically conductive contact-carrying means having a portion spaced from and positioned for engagement with said free end portion of said thermally responsive member; said contact-carrying means mounting one of said normally open contacts for creep movement into engagement with the other of said normally open contacts in response to movement of said thermally responsive member when the latter is heated to a second amount by the current flow therethrough to shunt out said entire thermally responsive member upon mutual engagement of said normally open contacts; and means electrically insulating said portion of said contact-carrying means from said free end portion of said thermally responsive member.

15. The relay as set forth in claim 14 and wherein said second amount is greater than said first amount.

16. A thermal relay for an electric motor having a main and a phase winding, said thermal relay comprising three electrical terminals; a pair of normally closed electrical contacts and a pair of normally open electrical contacts; one of said normally closed contacts being electrically connected to a first one of said terminals; a snap-acting electrically conducting thermally responsive member; electrically conducting switch means having one portion thereof electrically connected to a second one of said terminals; one of said normally open electrical contacts being electrically connected to the third one of said terminals; the other of said normally open contacts being electrically connected to and carried by said switch means for creep movement into and out of engagement with said one of said normally open contacts; said electrically conducting thermally responsive member having spaced portions adjacent one end thereof respectively electrically connected to and mounted on said second and third terminals and having a free end portion; the other of said normally closed contacts being electrically connected to and mounted on said free end portion of said thermally responsive member for snap movement into and out of engagement with said one of said normally closed contacts; said thermally responsive member being mounted for snap movement of said free end portion in response to heating by current flow therethrough to open said normally closed contacts at one heated condition; and said switching means having a portion thereof spaced from and positioned for engagement by the free end portion of said thermally responsive member to close said normally open contacts and thereby shunt out said thermally responsive member in response to movement thereof when the latter is at another heated condition.

17. The relay as set forth in claim 16 and wherein said thermally responsive member comprises a bifurcated composite metal snap-acting element, the free ends of each of the legs of said element being respectively electrically connected to and mounted on said second and third terminals, a portion of one of said legs having a deformation therein responsible for the snap action of the element; means associated with the one of said second and third terminals mounting said one leg for adjustably varying the amount of deformation of said portion of said one leg.

18. The switch structure as set forth in claim 8 and wherein only one of the legs of said bifurcated element is deformed and the deformation in said one leg is intermediate the ends thereof.

19. The switch as set forth in claim 9 and wherein said adjustable means comprises an electrical terminal.

20. The electrical switch as set forth in claim 8 and including a base; three electrical terminals mounted on said base in mutually electrically isolated relation; a first one of said terminals providing a first one of said pair of electrical contacts; the legs of said snap-acting bifurcated element being interconnected at one end thereof by a bight portion; said snap-acting bifurcated element being formed of electrically conductive material; the free end of each of the legs of said bifurcated element being respectively electrically connected to and cantilever mounted on the second and third ones of said terminals; and the second one of said pair of electrical contacts being positioned on said bight portion for movement into and out of engagement with said first contact.

21. The electrical switch structure as set forth in claim 8 and including a base; three electrical terminals mounted on said base in mutually electrically isolated relation; a first one of said terminals providing a first one of said pair of electrical contacts; the legs of said snap-acting bifurcated element being interconnected at one end thereof by a bight portion; said snap-acting element being formed of electrically conductive material; the free end of said deformed leg being electrically connected to and mounted on a second one of said terminals, the free end of the other leg of said snap-acting element being electrically connected to and mounted on the third one of said terminals thereby cantilever mounting said snap-acting element; the second one of said pair of electrical contacts being positioned on and electrically connected to said bight portion for movement into and out of engagement with said first contact; and said second terminal being adjustably mounted on said base for movement relative thereto in a direction longitudinally of said deformed leg for adjustably varying the deformation of said deformed leg.

22. The switch as set forth in claim 21 and wherein said snap-acting bifurcated element is formed of composite thermostatic material.

References Cited in the file of this patent

UNITED STATES PATENTS

| Re. 23,330 | Lucas | Jan. 16, 1951 |
|---|---|---|
| 1,809,305 | Matthews | June 9, 1931 |
| 2,018,896 | Pearce | Oct. 29, 1935 |
| 2,210,701 | Bletz | Aug. 6, 1940 |
| 2,267,463 | Hood et al. | Dec. 23, 1941 |
| 2,280,960 | Lee | Apr. 28, 1942 |
| 2,359,075 | Arnold | Sept. 26, 1944 |
| 2,363,280 | Arnold | Nov. 21, 1944 |
| 2,417,912 | Clark | Mar. 25, 1947 |
| 2,424,150 | Clark et al. | July 15, 1947 |
| 2,475,039 | Lucas | July 25, 1949 |
| 2,694,121 | Vander Pyl | Nov. 1, 1954 |
| 2,767,270 | Perkins | Oct. 16, 1956 |
| 2,782,291 | Cayet | Feb. 19, 1957 |
| 2,820,870 | Moksu | Jan. 21, 1958 |
| 2,825,785 | Taylor | Mar. 4, 1958 |
| 2,833,889 | Boddy | May 6, 1958 |
| 2,834,853 | Hood | Mar. 13, 1958 |
| 3,031,565 | Appleton et al. | Apr. 24, 1962 |

FOREIGN PATENTS

| 305,510 | Italy | Feb. 8, 1933 |
|---|---|---|
| 982,063 | France | Jan. 24, 1951 |